July 7, 1964
B. LONG
3,140,164
APPARATUS FOR PRODUCING SHEET GLASS
Filed May 3, 1960
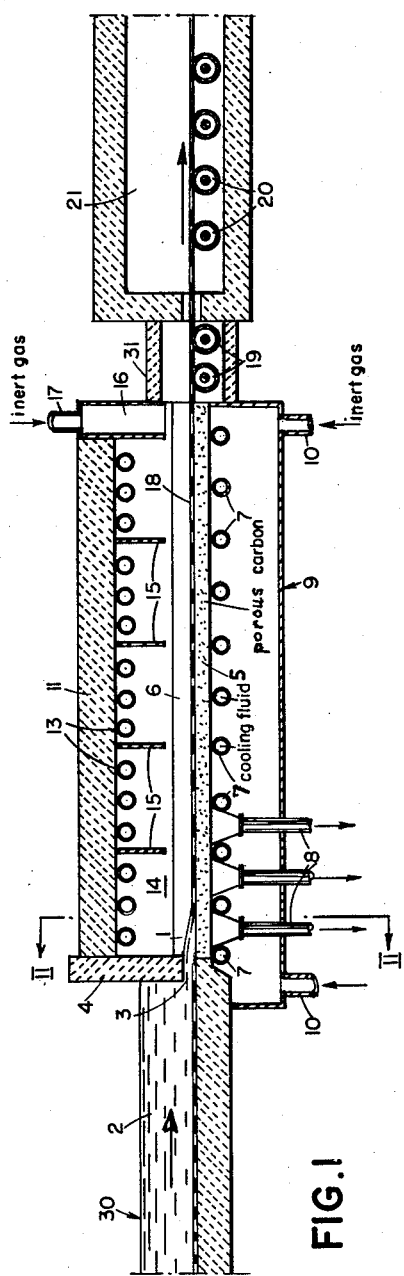
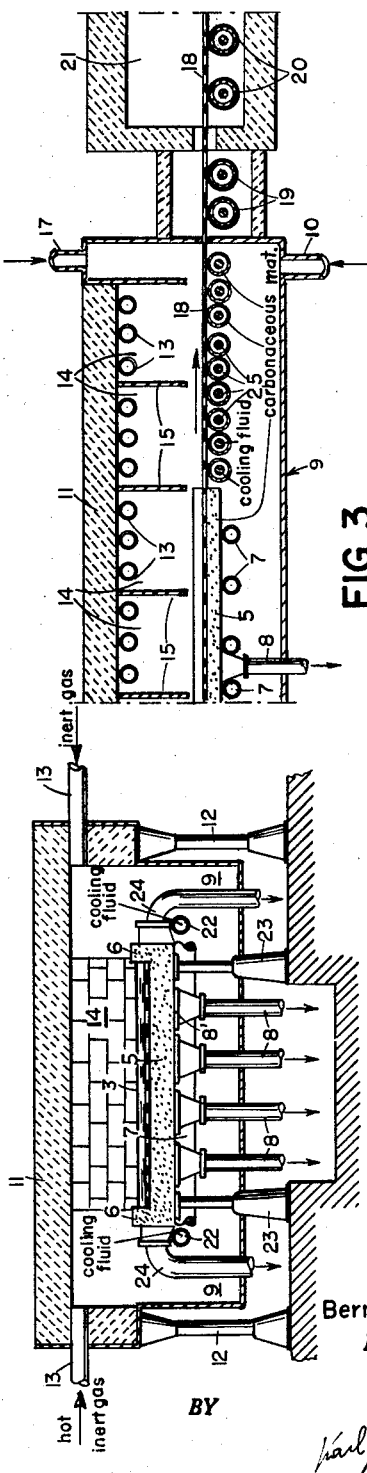
Bernard Long
*INVENTOR.*
BY
*AGENT.*

3,140,164
APPARATUS FOR PRODUCING SHEET GLASS
Bernard Long, Paris, France, assignor to G.B.D. Societe Anonyme Holding, Luxembourg, Grand Duchy of Luxembourg, a corporation of Luxembourg
Filed May 3, 1960, Ser. No. 26,486
Claims priority, application France May 15, 1959
7 Claims. (Cl. 65—157)

My present invention relates to the production of sheet glass and, more particularly, to a process and apparatus for producing a continuous sheet of glass.

A principal object of my present invention is to provide an improved process for producing sheet glass which has the fire-polished surface of mechanically drawn glass and is free from striae or other surface irregularities, as well as means for carrying out the improved process.

Another object of the invention is to provide a process and means for producing a continuous sheet of glass having substantially uniform thickness throughout its length and breadth, regardless of the extent of the sheet.

Prior attempts to realize some of the above objects through the use of a non-adhering support of graphite for the flow of hot glass were not successful because, on the one hand, the reducing action of the graphite upon the glass gives rise to considerable gas evolution, thus resulting in the information of bubbles within the sheet, and, on the other hand, the heated graphite support deteriorates rapidly because of oxidation at these high temperatures. It is, therefore, a more specific object of this invention to provide a process and means for utilizing a support of this type in the formation of sheet glass with avoidance of the drawbacks referred to.

According to a feature of the invention, I provide an improved process for forming a sheet of glass having the desired fire-polished surface and freedom from surface irregularities, comprising the step of solidifying a relatively thin layer of liquid glass in contact with a cooled, porous bed of carbonaceous material (e.g., graphite or amorphous carbon) while aspirating, through the pores of the bed, the gases formed at the interface by the reaction between the carbonaceous material and the liquid glass, thereby preventing the occlusion of bubbles in the hardening sheet. The lower face of the glass sheet, cooled relatively rapidly in contact with the carbonaceous support which it does not wet and to which it therefore does not adhere, and the upper face of the sheet, which is cooled at a considerably slower rate, have been found to resemble mechanically polished surfaces. In order to prevent deterioration of the carbonaceous supporting material, I envelop the vitreous layer and the carbon bed in a non-oxidizing atmosphere.

According to another feature of the invention, I provide a sheet-forming apparatus comprising a trough whose floor and lateral walls constitute the aforementioned bed of carbonaceous material. The trough has a thermally insulated cover or roof adapted to prevent substantially all upward escape of heat from the layer of liquid glass, thereby maintaining its upper stratum in a state of high mobility. This vitreous layer, which may flow from a conventional tank furnace onto the floor of the trough, is advantageously subjected to the temperature-controlling action of a coolant circulating below the interface of the carbonaceous bed with the glass layer to accelerate the solidification of the sheet. Whereas the lower surface of the liquid layer begins to stiffen immediately upon contact with the cooled bed, the upper surface of the layer is maintained at a relatively higher temperature since the cooling of this upper surface is effectively retarded by the superstructure of the trough. Surrounding the liquid glass layer, as it issues from the tank furnace at elevated temperatures, is an inert gas, such as high-purity (99.99%) nitrogen, free from both oxygen and carbon dioxide which would tend to react with the carbonaceous bed at these temperatures to cause the deterioration of the glass-supporting surface thereof.

In order to minimize agitation of the inert gas overlying the vitreous mass drawn from the tank furnace, I prefer to subdivide the space above this mass by a plurality of transverse partitions which extend close to the glass level to impede the passage of longitudinal convection currents due to the existence of a temperature gradient in the direction of flow. The protective gas, preferably heated slightly above the temperature required in each of the zones of progressive solidification defined by the partitions, is advantageously introduced into these zones through openings close to the roof of the trough, thus avoiding any wave-causing disturbance of the melt surface; the rate of admission of this gas will be substantially equal to the rate of gas aspiration through the interstices of the preferably highly permeable carbonaceous bed. A slight pull applied to the completely solidified downstream portion of the sheet suffices to draw the more fluid upstream portion over the bed by reason of the low sliding friction encountered at the interface between the bed and the relatively viscous lower stratum of the flow; this low friction also improves the appearance of the longitudinal edges of the sheet, particularly if means are provided for energetically cooling the side walls of the trough to counteract the tendency of the sheet to spread transversely to its direction of flow. Furthermore, the tank furnace should be tapped at a location sufficiently below the level of the bath therein to supply an adequate hydrostatic pressure which propels the solidifying sheet through the cooling zones. The resulting minimization of the necessary traction forces avoids the formation of surface striations which tend to arise from an uneven liquid flow due to excessive tensile stresses.

The glass sheet, after partial solidification, can be fed to an annealing tunnel in which the temperature of the sheet is first equalized throughout its thickness and then gradually lowered in a manner well known per se. The sheet, on entering this tunnel, may have a temperature of approximately 700° C. at its top surface and a sufficiently lower temperature at its bottom surface to be supportable by horizontal rollers whose crests are level with the floor of the carbonaceous bed. Similar rollers may, if desired, also be provided in the last cooling zone or zones in lieu of the stationary supporting bed, these latter rollers advantageously consisting of non-adhering carbonaceous material.

While a lowering of the flow temperature tends to reduce the evolution of gas, the production rate for a sheet of given thickness increases with the temperature of the melt discharged from the furnace. These considerations determine the choice of the initial temperature of the liquid glass which, preferably, should be such that the glass has a viscosity between $10^4$ and $10^{2.5}$ poises. The corresponding temperatures for ordinary soda-lime glass range between 1000° and 1300° C.; they are different for other vitreous compositions. Soda-lime glass reacts with the carbonaceous bed to form gases which consist primarily of sulfur dioxide, the rate of its evolution depending upon the sulfur-trioxide content of the glass. Thus, gassing may be limited by an appropriate selection of the proportions of sodium sulfate and carbon in the original vitreous mixture to reduce the amount of $SO_3$ to a minimum. Some glass mixtures also contain small quantities of arsenic and antimony oxides which may be reduced to the free metals by the action of the carbonaceous material; these reactions can also be largely suppressed by minimizing the quantities of the oxides of such metals in the bath.

The above and other objects, features and advantages of my present invention will become more readily apparent from the following description, reference being made to the accompanying drawing in which:

FIG. 1 is a longitudinal cross-sectional view of an apparatus according to the invention;

FIG. 2 is a cross-sectional view taken along line II—II of FIG. 1; and

FIG. 3 is a view similar to FIG. 1 of an apparatus representing another embodiment of the invention.

In FIGS. 1 and 2 I show a conventional tank furnace 30 whose glass bath 2 issues through a slot 3 at the bottom of a wall 4 of the furnace. The stream flowing from slot 3 forms a layer 1 of liquid glass upon the floor of a trough 5 having lateral ledges 6 to contain the vitreous mass. Trough 5 is supported on leveling jacks 23 within a solidification chamber 9 whose roof 11, carried by posts 12, is formed of a thermally insulating material to prevent the escape of heat from the upper surface of layer 1. The bed of trough 5 and the ledges 6 thereof consist of a highly porous carbonaceous material such as graphite or amorphous carbon. Along the bottom of trough 5 there extend a plurality of coolant-carrying pipes 7 and, between the first four of these pipes, three rows of four suction tubes 8 whose mouths abut the bottom of the trough 5 by way of asbestos joints 8' and which are connected to a generator of reduced pressure such as a suction pump (not shown). Through a pair of inlets 10 a protective gas, such as very pure nitrogen which does not react with heated carbon at the temperatures involved, is introduced from below into the solidification chamber 9. The upper portion of this chamber is divided by transverse partitions 15, which extend from just above the trough 5 to the superstructure 11, into a plurality of cooling zones 14 following one another along the transport path of the glass sheet. At the extremity at which the sheet leaves the chamber, I provide a compartment 16 into which the nitrogen or other non-oxidizing gas free from oxygen and carbon dioxide is admitted from above via a conduit 17. The lateral walls of chamber 9 are provided with inlet ports 13 close to the roof 11 of each zone 14 through which a like gas is introduced in heated condition. The longitudinal ledges 6 of the trough 5 are cooled by means of fluid-carrying pipes 22, several pairs of suction tubes 24 being longitudinally spaced along these walls and connected to the same aspirator (not shown) as the tubes 8.

In operation, the highly fluid glass layer 1, flowing from the tank furnace 30 onto the floor of the trough 5, stiffens along its bottom surface soon after contacting the cooled surface of the carbonaceous bed. The glass reacts with the carbon at the interface therebetween to produce gases which are aspirated through the porous trough 5 by means of the suction tubes 8 spaced along the bottom of the trough and by the similarly operating tubes 24 positioned along the lateral ledges 6 thereof.

The glass layer 1 is advanced along the bed through the solidification zones 14 wherein the upper surface of the layer, which retains a higher temperature than the trough-supported lower surface, is progressively cooled by thermal conduction through the layer itself, there being substantially no heat loss from that surface in an upward direction. A slight temperature differential between adjacent zones 14 is maintained by introducing the non-oxidizing gas into each zone 14 at a temperature substantially equaling or slightly exceeding the desired sheet temperature therein. The non-oxidizing gas is blown with force through the compartment 16, thereby providing a gas seal at the exit slot of the solidification chamber 9 to prevent the entrance of atmospheric air.

The self-supporting glass sheet 18 emerging from chamber 9 passes over a pair of idler rollers 19 in an intermediate chamber 31 whence it enters an annealing tunnel 21 whose rollers 20 are driven by an electric motor or the like (not shown) to draw the sheet through the apparatus for annealing and final cooling in a manner known per se.

In FIG. 3 I show an apparatus similar to that described above, with the exception, however, that the downstream portion of trough 5 is replaced by a plurality of tubular carrier rollers 25 of non-adhering carbonaceous material journaled in the lateral walls of the solidification chamber 9 and adapted to carry the partially solidified sheet 18 through the last cooling zones 14 thereof. The rollers 25, which may be axially traversed by a cooling fluid such as water, serve to reduce the retarding friction of the sheet even further. The carbonaceous material of these rollers may be the same as or different from that constituting the trough 5.

The invention as described and illustrated admits of many modifications and variations believed to be well within the ability of persons skilled in the art and intended to be included within the spirit and scope of the invention, except as further limited by the appended claims.

I claim:

1. For use with a tank furnace having an outlet from which flows a mass of molten glass, an apparatus for producing a flat sheet of glass comprising, in combination:

a porous trough of carbonaceous material extending outwardly from the outlet of the tank furnace and positioned to receive the mass of molten glass issuing therefrom, said trough forming a flat, substantially horizontal bottom and longitudinally extending continuous and generally parallel upstanding ledges to confine the flow of said mass of molten glass between them;

means forming a chamber surrounding said trough;

supply means connected to said chamber for admitting a nonoxidizing gas into said chamber;

suction-tube means in contact with the underside of said trough for withdrawing evolving gases therethrough;

and cooling means contacting said trough for progressively reducing the temperature of the underside of said flow until the latter is solidified into a self-supporting sheet.

2. An apparatus according to claim 1 wherein said chamber is provided with a thermally insulating superstructure substantially preventing the loss of heat from the upper face of said flow to the surrounding atmosphere.

3. An apparatus according to claim 2 wherein said supply means comprises a plurality of inlets for said non-oxidizing gas located directly underneath said superstructure in a position remote from the upper face of said flow.

4. An apparatus according to claim 3, further comprising a plurality of transverse partitions extending downwardly from said superstructure to substantially the level of said flow at longitudinally spaced locations within said chamber, thereby dividing said chamber into a plurality of cooling zones each provided with at least one of said inlets.

5. An apparatus according to claim 1, further comprising means at the discharge end of said chamber for creating around said sheet a stream of said non-oxidizing gas preventing the entrance of atmospheric air into said chamber.

6. An apparatus according to claim 1 wherein said cooling means comprises a plurality of coolant-carrying conduits disposed directly underneath said trough and immediately outside said ledges.

7. An apparatus according to claim 1, further comprising supplemental suction-tube means in contact with the outside of said ledges for withdrawing evolving gases through the latter.

References Cited in the file of this patent

UNITED STATES PATENTS

| | | |
|---|---|---|
| 814,631 | Wadsworth | Mar. 6, 1906 |
| 1,255,450 | McCoy | Feb. 5, 1918 |
| 1,489,823 | Crowley | Apr. 8, 1924 |
| 1,554,267 | Ewing | Sept. 22, 1925 |
| 1,657,214 | Kutchka | Jan. 24, 1928 |
| 1,735,595 | Blair | Nov. 12, 1929 |
| 1,884,926 | Van Ness | Oct. 25, 1932 |
| 2,386,820 | Spencer | Oct. 16, 1945 |
| 2,612,726 | Nordberg | Oct. 7, 1952 |
| 2,717,474 | Barradell-Smith | Sept. 13, 1955 |
| 2,902,796 | McDuffee | Sept. 8, 1959 |
| 2,911,759 | Pilkington et al. | Nov. 10, 1959 |